United States Patent [19]

Masutani

[11] Patent Number: 5,442,419
[45] Date of Patent: Aug. 15, 1995

[54] PAPER MASK DEVICE

[75] Inventor: Hironori Masutani, Wakayama, Japan

[73] Assignee: Noritsu Koki Co., Ltd., Wakayama, Japan

[21] Appl. No.: 252,783

[22] Filed: Jun. 2, 1994

[30] Foreign Application Priority Data

Jun. 3, 1993 [JP] Japan .................. 5-133256

[51] Int. Cl.6 .................................. G03B 27/58
[52] U.S. Cl. ........................ 355/74; 355/126
[58] Field of Search ............... 355/71, 74, 126

[56] References Cited

U.S. PATENT DOCUMENTS

| | | | |
|---|---|---|---|
| 1,037,198 | 9/1912 | Boyd | 355/126 |
| 1,661,151 | 2/1928 | Little et al. | |
| 3,089,384 | 5/1963 | Baasner | 355/74 |
| 3,273,452 | 9/1966 | Saunders | 355/74 |
| 3,484,165 | 12/1969 | Denner | 355/126 X |
| 3,622,240 | 11/1971 | Smith, Jr. | 355/74 |
| 3,737,227 | 6/1973 | Harter et al. | 355/74 |
| 3,779,643 | 12/1973 | Nosco et al. | 355/75 |
| 3,807,861 | 4/1974 | Nosco et al. | 355/75 |
| 3,980,407 | 9/1976 | Hill | 355/71 |
| 4,150,895 | 4/1979 | Northrup et al. | 355/74 |
| 4,190,357 | 2/1980 | Kostiner | 355/74 |
| 4,320,965 | 3/1982 | Kimura et al. | |
| 4,568,180 | 2/1986 | Kogane | 355/74 |
| 4,583,837 | 4/1986 | Shiga | 355/74 X |
| 4,634,268 | 1/1987 | Kogane | 355/74 |
| 5,005,044 | 4/1991 | Yahata et al. | 355/40 |

FOREIGN PATENT DOCUMENTS

85/01918  5/1985  WIPO .

*Primary Examiner*—Richard A. Wintercorn
*Attorney, Agent, or Firm*—Wenderoth, Lind & Ponack

[57] ABSTRACT

A paper mask device in which the position of longitudinal masks can be changed without damaging a web of printing paper. When it is changed from the borderless printing to the printing with border, one ends of the longitudinal masks are moved inwardly toward each other by means of a first transfer unit while keeping the other ends overlapped on the edges of the printing paper. A second transfer unit then operates to move the other ends of the longitudinal masks inwardly to set the width of the print size. The longitudinal masks can be overlapped on both edges of the printing paper without damaging it.

1 Claim, 7 Drawing Sheets

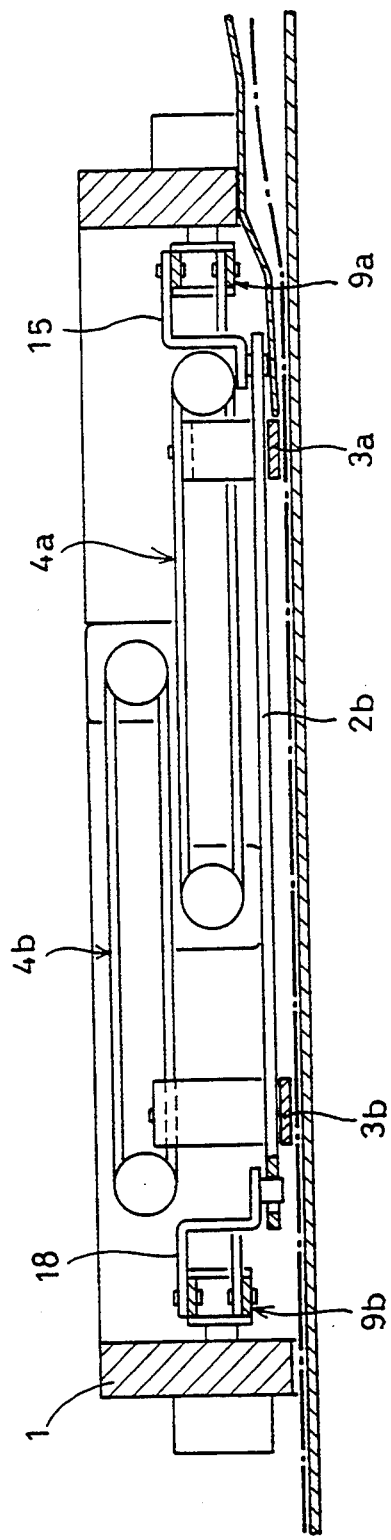

PAPER MASK DEVICE

This invention relates to a paper mask device used when negative images on a negative film are printed on a web of printing paper.

FIG. 6 shows a conventional paper mask device. Under a negative mask 30 holding a negative film F is provided a light source 31 which illuminates the negative film F. A negative image on the negative film F is printed on a web of printing paper A through a pair of reflective mirrors 32 and 33. In such a printing apparatus, a paper mask 34 is mounted on the web of printing paper A to set the print size.

The paper mask 34 shown in FIG. 7 is known. It is provided over the web of printing paper A fed in one way and comprises a pair of longitudinal masks 35a and 35b, and a pair of transverse masks 36a and 36b. The longitudinal masks 35a and 35b are moved relative to each other by a single transfer unit 37, and the transverse masks 36a and 36b are similarly moved relative to each other by a single transfer unit 38.

In each of the transfer units 37 and 38, an endless belt 41 is stretched around a pair of pulleys 39 and 40. The pulley 39 is driven by a motor 42.

With the paper mask 34, when the borderless printing is to be carried out, both of the longitudinal masks 35a and 35b are positioned outside of both edges of the web of printing paper A. For the printing with border, the longitudinal masks 35a and 35b are moved toward each other to mask both edges of the printing paper A, and the transverse masks 36a and 36b are moved inwardly toward each other. The printing with border is then carried out.

With such a conventional paper mask device, the longitudinal masks 35a and 35b are moved toward and away from each other. Let us suppose that the web of the printing paper is curved in a width direction as shown in FIG. 8A. When it is changed from the borderless printing to the printing with border, the longitudinal masks 35a and 35b, while moved inwardly toward each other, are likely to abut both edges of the web of printing paper A inwardly and damage it as shown in FIG. 8B.

An object of the present invention is to provide a paper mask device in which a pair of longitudinal masks do not damage the web of printing paper even if it is curved in a width direction.

According to the present invention, there is provided a paper mask device comprising a pair of longitudinal masks provided in a longitudinal direction of a web of printing paper, and a pair of transverse masks provided in a transverse direction, the pair of longitudinal masks and the pair of transverse masks being moved relative to each other to change the print size, characterized in that a first transfer unit for moving one ends of the pair of longitudinal masks relative to each other and a second transfer unit for moving the other ends of the pair of longitudinal masks relative to each other are provided, the pair of longitudinal masks being coupled to the first and second transfer units so that they can take oblique positions.

In the paper mask device as arranged above, the borderless printing is carried out with the longitudinal masks positioned outside of both edges of the web of printing paper. When it is changed from the borderless printing to the printing with border, one ends of the pair of longitudinal masks are moved toward each other to such a position as to mask the edges of the web of printing paper by the first transfer unit; the other ends of the longitudinal masks are then moved toward each other by the second transfer unit so that the pair of the longitudinal masks will be positioned parallel to each other; and now that they mask both edges of the web of printing paper, the pair of the transverse masks are moved inwardly toward each other.

With the paper mask device according to the present invention, when it is changed from the borderless printing to the printing with border, one ends of the longitudinal masks are moved inwardly while keeping the other ends overlapped on the edges of the printing paper. Thus, even if the web of printing paper is curved in a width direction, the position of the longitudinal masks can be changed without damaging the web of printing paper.

Other features and objects of the present invention will become apparent from the following description made with reference to the accompanying drawings, in which:

FIG. 3 is a sectional view taken along line III—III of FIG. 2;

Figure 1:
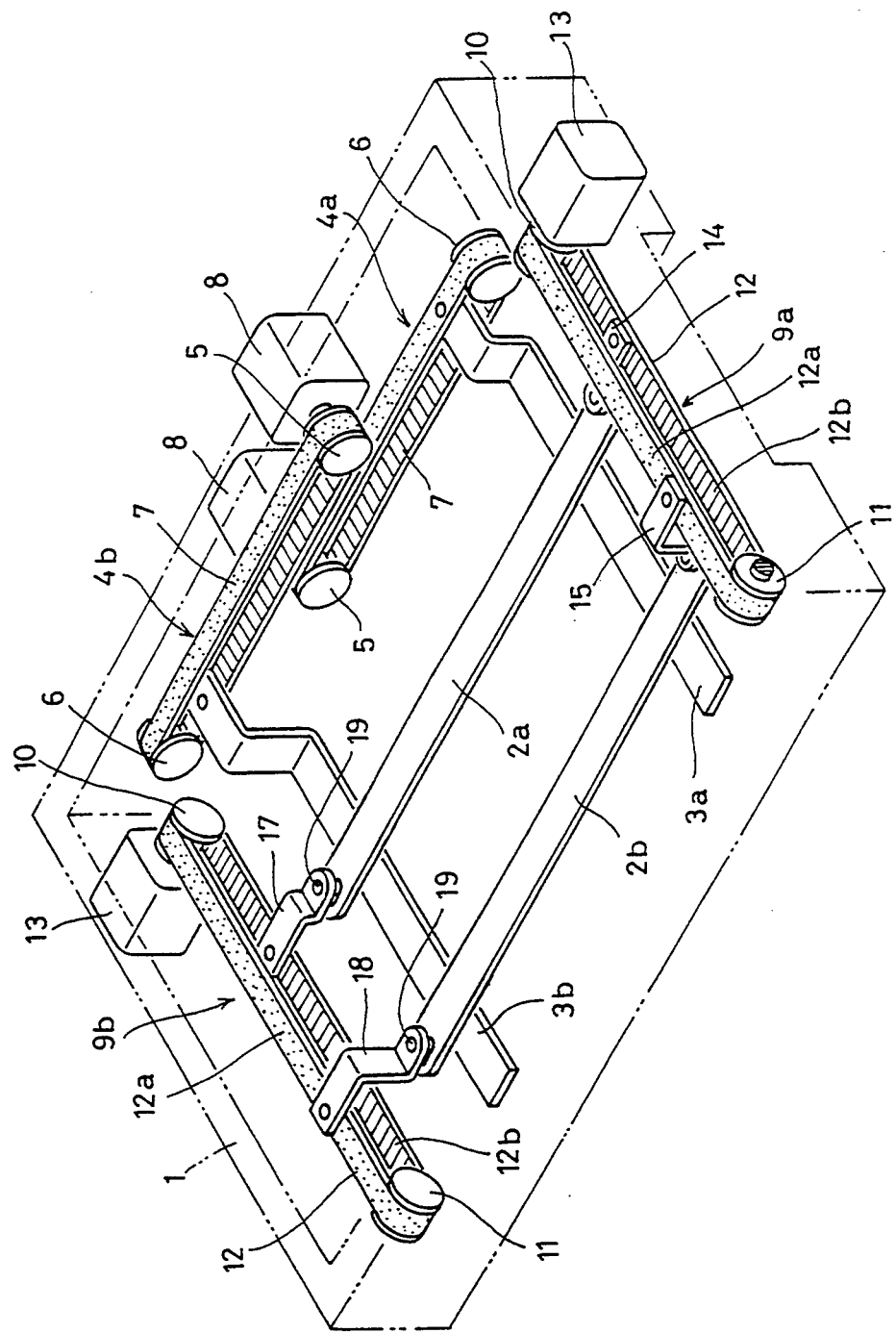
FIG. 1 is a perspective view showing one embodiment of the paper mask device according to the present invention.
Figure 2:
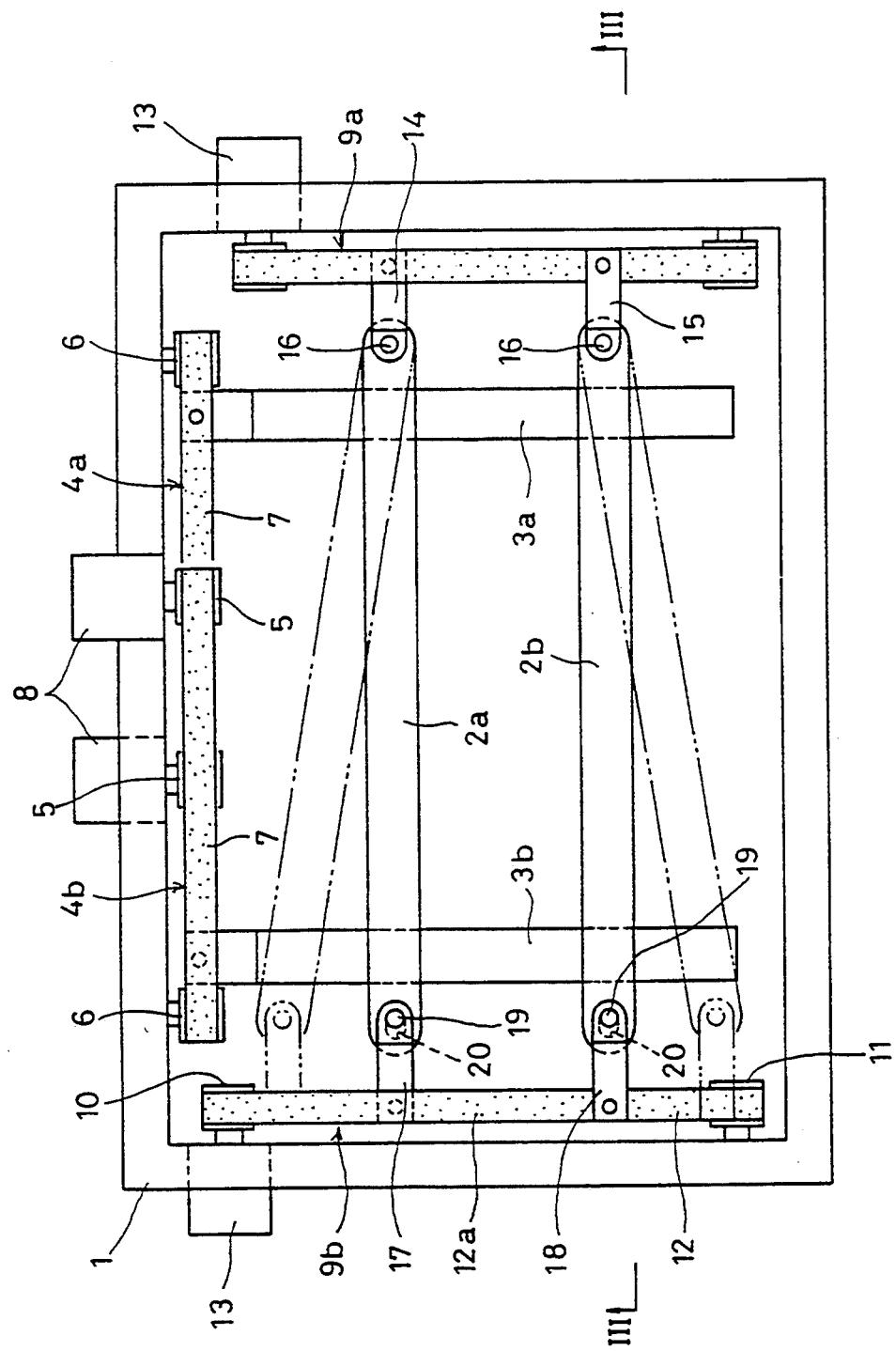
FIG. 2 is a plan view of the same.

As shown in FIGS. 1-3, a rectangular mask frame 1 is provided therein with a pair of longitudinal masks 2a and 2b and a pair of transverse masks 3a and 3b. Each of the longitudinal masks 2a and 2b and the transverse masks 3a and 3b is in the form of a strip of plate. The longitudinal masks 2a and 2b extend in a longitudinal direction of the rectangular mask frame 1 and are placed over so as to cross the transverse masks 3a and 3b.

Inside the mask frame 1 are mounted a pair of transfer units 4a and 4b for the transverse masks 3a and 3b, respectively.

Each of the transfer units 4a and 4b comprises an endless belt 7 stretched around a pair of pulleys 5 and 6 and a motor 8 for driving the pulley 5 to move the belt 7. Each of the transverse masks 3a and 3b has one end secured to the respective belt 7.

Figure 7:
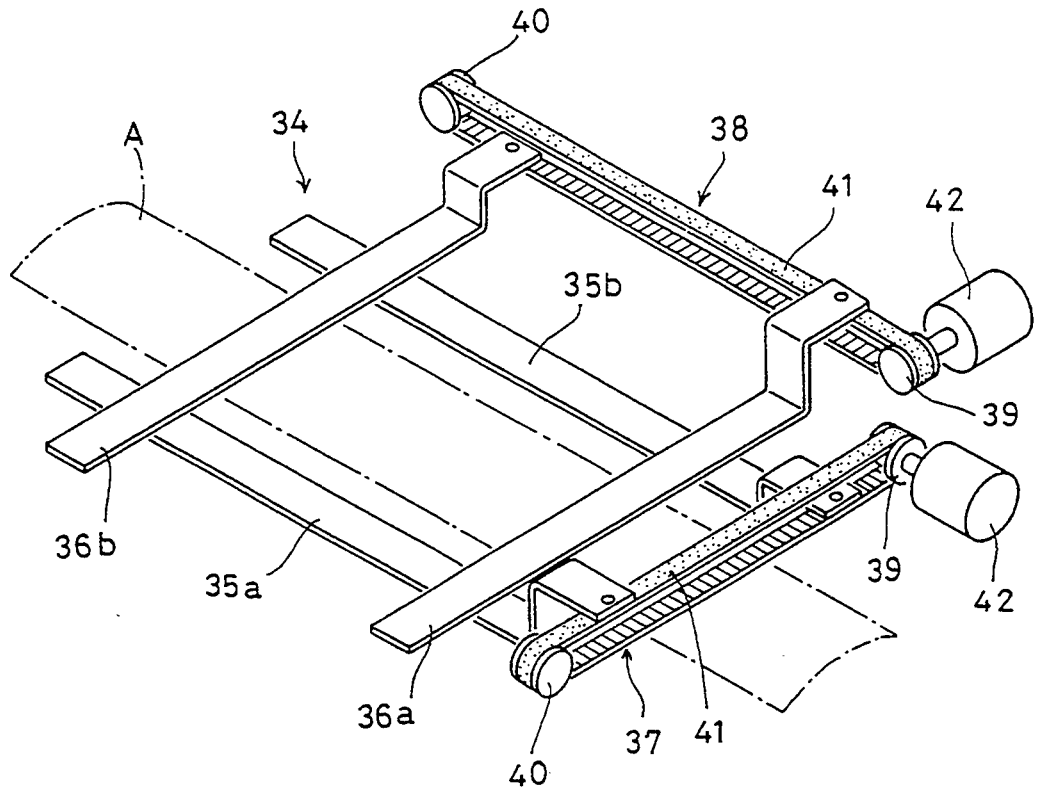
FIG. 7 is a perspective view showing a conventional paper mask device.
Figure 8A:
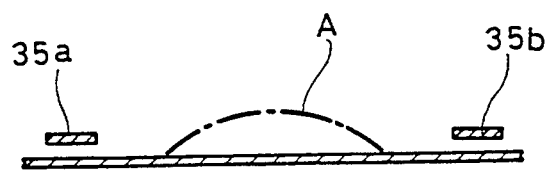
FIG. 8A is a sectional view of the same showing how the borderless printing is carried out.
Figure 8B:
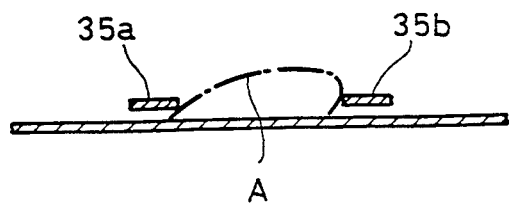
FIG. 8B is a sectional view of the same showing the state when it is changed to the printing with border.

But the transverse masks 3a and 3b may be moved toward and away from each other by a single transfer unit as in the conventional paper mask device shown in FIG. 7.

Inside the mask frame 1 are mounted a first transfer unit 9a for feeding one ends of the longitudinal masks 2a and 2b toward and away from each other and a second transfer unit 9b for feeding the other ends of the longitudinal masks 2a and 2b toward and away from each other.

Each of the first and second transfer units 9a and 9b comprises an endless belt 12 stretched around a pair of pulleys 10 and 11 and a motor 13 for driving the pulley 10 to move the belt 12.

Coupling pieces 14 and 15 are secured to the belt 12 on its tight side 12a and on its loose side 12b, respectively, and one ends of the longitudinal masks 2a and 2b are rotatably coupled to the coupling pieces 14 and 15 through pins 16, respectively.

Coupling pieces 17 and 18 are similarly secured to the belt 12 on its tight side 12a and on its loose side 12b, respectively. Pins 19 are mounted on one ends of the coupling pieces 17 and 18 and inserted in pin holes 20 formed in the other ends of the longitudinal masks 2a and 2b, respectively. Each pin hole 20 is in the form of an elongated hole in a longitudinal direction of the longitudinal masks 2a and 2b.

By providing the first transfer unit 9a for moving one ends of the longitudinal masks 2a and 2b toward and away from each other and the second transfer unit 9b for moving the other ends of the longitudinal masks 2a and 2b toward and away from each other, with the first transfer unit 9a stopped, the second transfer unit 9b can operate. Thus, by moving their one ends toward or away from each other, the longitudinal masks 2a and 2b can form an oblique position.

Figure 4A:
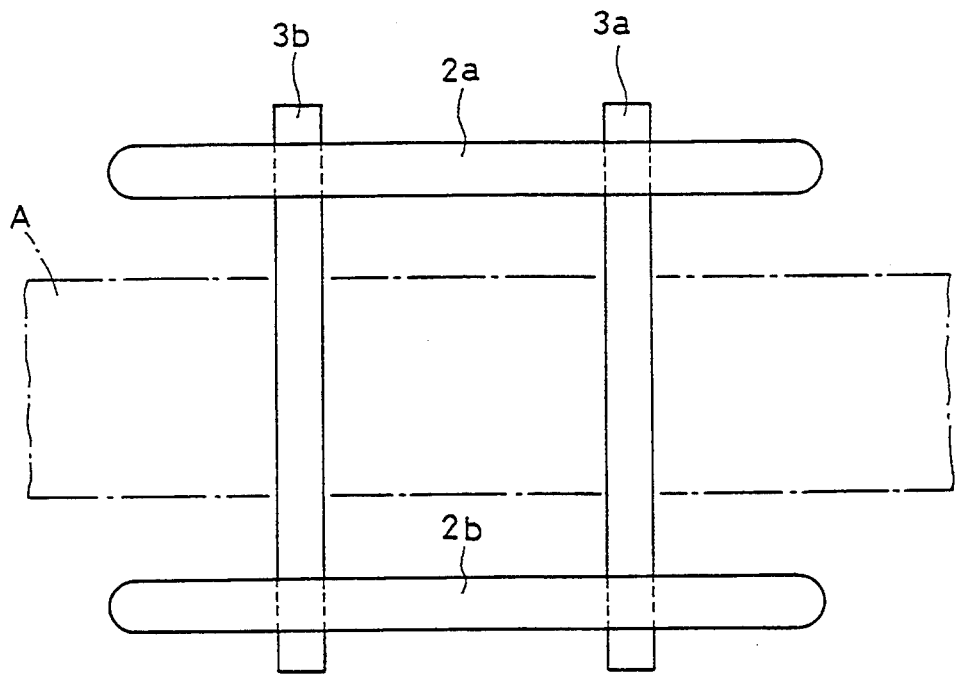
FIG. 4A is a plan view showing how the borderless printing is carried out.

When the borderless printing is carried out as shown in FIG. 4A, the longitudinal masks 2a and 2b are positioned outside of both edges of the web of printing paper A.

Figure 4B:
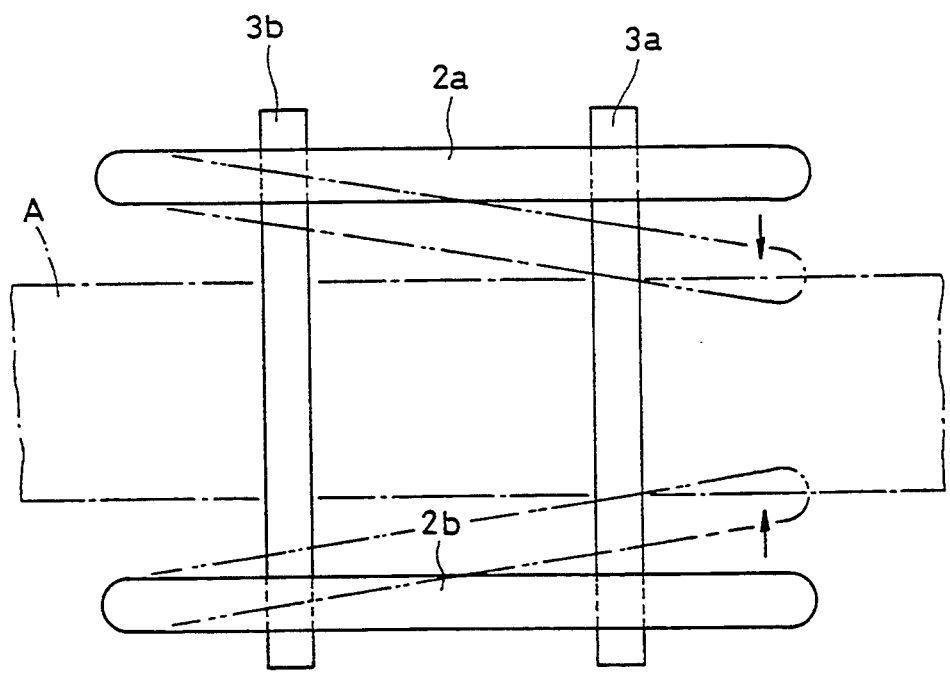
FIG. 4B is a plan view showing how the longitudinal masks are moved.
Figure 5A:
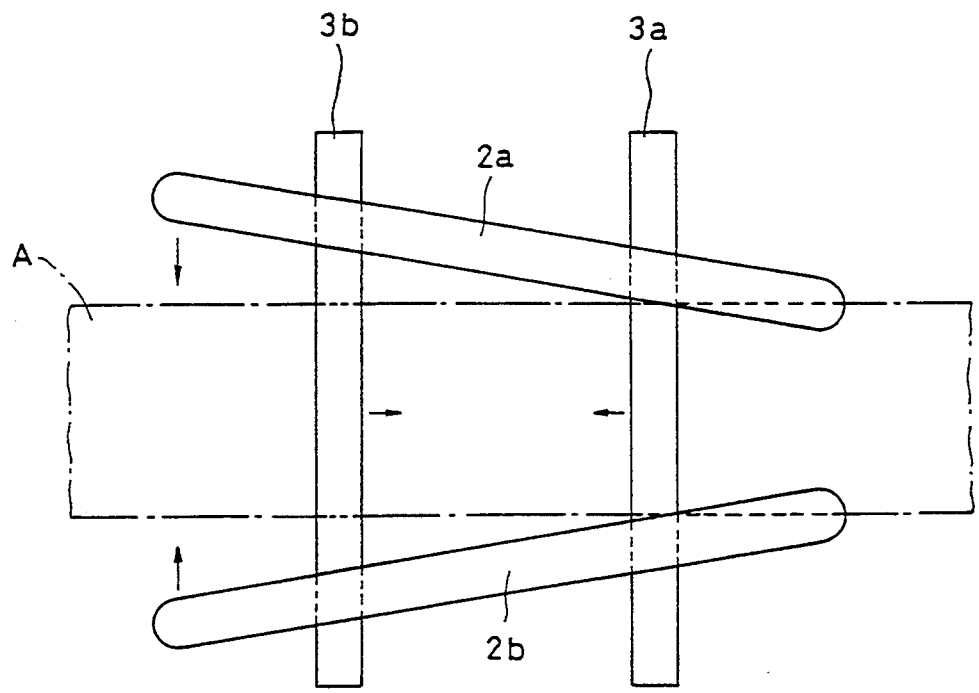
FIG. 5A is a plan view showing how the longitudinal and transverse masks are moved.
Figure 5B:
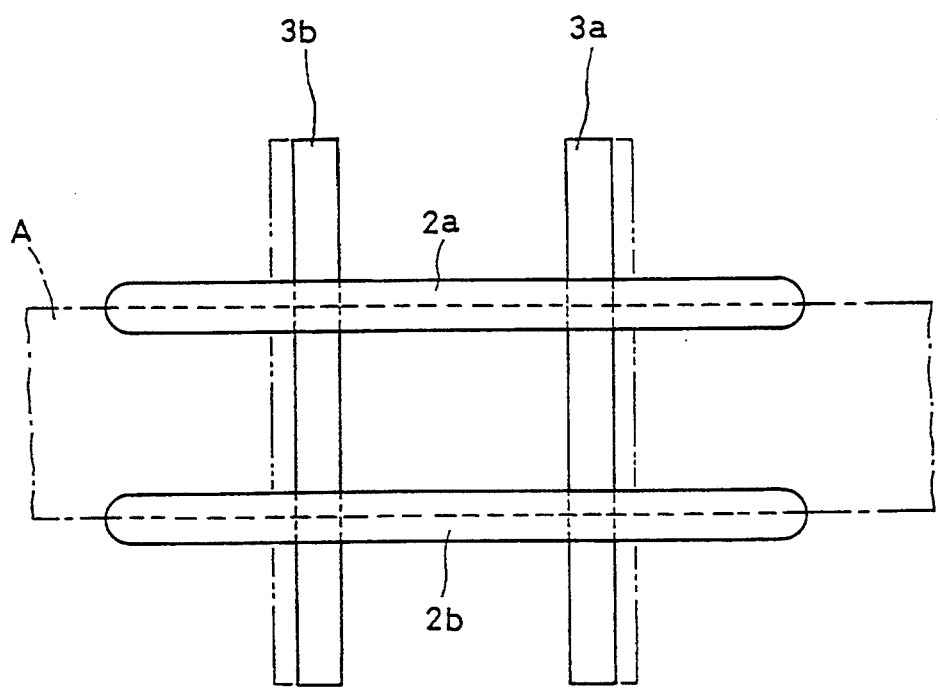
FIG. 5B is a plan view showing how the printing with border is carried out.
Figure 6:
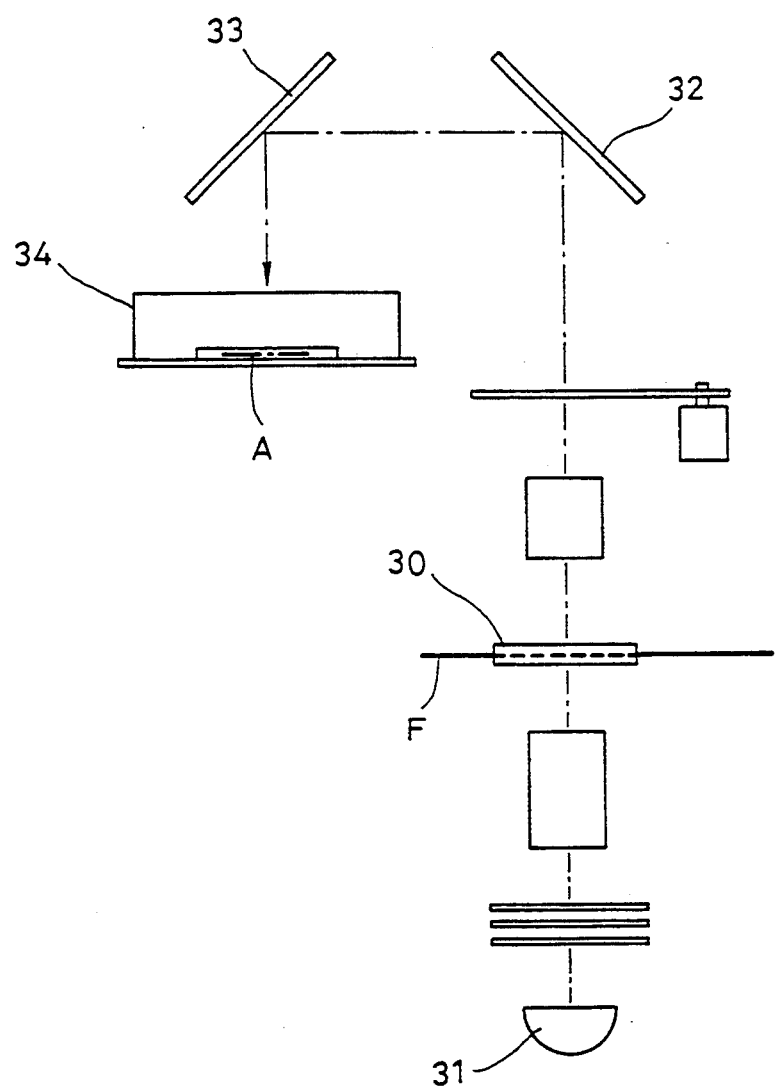
FIG. 6 is a schematic view of the printing unit.

When it is changed from the borderless printing to the printing with border, the first transfer unit 9a is activated to move one ends of the longitudinal masks 2a and 2b inwardly toward each other as shown in FIGS. 4B and 5A. Then, the second transfer unit 9b is activated to move the other ends of the longitudinal masks 2a and 2b inwardly toward each other as shown in FIG. 5A. Now, the longitudinal masks 2a and 2b are positioned parallel to each other as shown in FIG. 5B and overlapped on the edges of the printing paper A. In this state, the transverse masks 3a and 3b, too, are moved inwardly toward each other by means of the transfer units 4a and 4b to set the length of the print size.

When the position of the longitudinal masks 2a and 2b is changed, these masks have their other ends moved inwardly toward each other with their one ends already moved toward each other. Therefore, even if the web of printing paper A is curved in a width direction, the longitudinal masks 2a and 2b will not interfere with the edges of the web of printing paper A. Thus, the position of the longitudinal masks 2a and 2b can be changed without the fear of damaging the web of printing paper A.

What is claimed is:

1. A paper mask device comprising a pair of longitudinal masks provided in a longitudinal direction of a web of printing paper, and a pair of transverse masks provided in a transverse direction, said pair of longitudinal masks and said pair of transverse masks being moved relative to each other to change the print size, characterized in that a first transfer unit for moving one end of said pair of longitudinal masks relative to each other and a second transfer unit for moving the other ends of said pair of longitudinal masks relative to each other are provided, said pair of longitudinal masks being coupled to said first and second transfer units so that they can take oblique positions.

* * * * *